United States Patent
Chen (10) Patent No.: US 10,603,842 B2
(45) Date of Patent: Mar. 31, 2020

(54) INTEGRATED 3D PRINTING SYSTEM

(71) Applicants: XYZPRINTING, INC., New Taipei (TW); KINPO ELECTRONICS, INC., New Taipei (TW)

(72) Inventor: Peng-Yang Chen, New Taipiei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 0 days.

(21) Appl. No.: 16/127,047

(22) Filed: Sep. 10, 2018

(65) Prior Publication Data
US 2020/0016839 A1    Jan. 16, 2020

(30) Foreign Application Priority Data

Jul. 13, 2018 (CN) .......................... 2018 1 0776619

(51) Int. Cl.
*B29C 64/393* (2017.01)
*B33Y 30/00* (2015.01)
(Continued)

(52) U.S. Cl.
CPC ........ *B29C 64/393* (2017.08); *B28B 17/0081* (2013.01); *B33Y 30/00* (2014.12);
(Continued)

(58) Field of Classification Search
CPC ....... B29C 64/393; B29C 64/20; B33Y 50/02; B33Y 30/00; B28B 17/0081; B28B 1/001;
(Continued)

(56) References Cited

U.S. PATENT DOCUMENTS

2011/0003025 A1* 1/2011 Patel ...................... B29C 51/08
425/504
2012/0072001 A1* 3/2012 Knighton ............ B29C 67/0088
700/108
(Continued)

FOREIGN PATENT DOCUMENTS

JP      2018075768 A      5/2018

OTHER PUBLICATIONS

Search Report dated Dec. 7, 2018 of the corresponding European patent application.
(Continued)

*Primary Examiner* — Nahida Sultana
(74) *Attorney, Agent, or Firm* — Chun-Ming Shih; HDLS IPR SERVICES (57) ABSTRACT

An integrated 3D printing system (1) includes a server (6) and multiple 3D printers (4) respectively implementing different printing types. The server (6) opens up a 3D object (50) which is consisted of multiple separable sub-objects (51-57) through a graphic user interface (GUI, 61). The GUI (61) obtains a designated characteristic of each sub-object (51-57) for performing a characteristic-classification to the multiple sub-objects (51-57). The server (6) provides a plurality of configuration tools (31-33) through a processor (62). Each of the plurality of configuration tools (31-33) performs a slicing process on the sub-object (51-57) with the corresponding characteristic for generating slicing data, and transmits the slicing data with the corresponding characteristic to one of the multiple 3D printers (4) with a corresponding printing type for being printed.

8 Claims, 6 Drawing Sheets

(51) Int. Cl.
  *B33Y 50/02* (2015.01)
  *B28B 17/00* (2006.01)
  *G06T 19/00* (2011.01)
  *B29C 64/20* (2017.01)
  *B22F 3/00* (2006.01)
  *B28B 1/00* (2006.01)

(52) U.S. Cl.
  CPC ............... *B33Y 50/02* (2014.12); *G06T 19/00* (2013.01); *B22F 3/008* (2013.01); *B28B 1/001* (2013.01); *B29C 64/20* (2017.08); *G06T 2200/04* (2013.01); *G06T 2200/24* (2013.01); *G06T 2219/004* (2013.01)

(58) Field of Classification Search
  CPC ............... G06T 19/00; G06T 2219/004; G06T 2200/04; G06T 2200/24; B22F 3/008
  See application file for complete search history.

(56) References Cited

U.S. PATENT DOCUMENTS

| | | | |
|---|---|---|---|
| 2015/0057784 A1* | 2/2015 | Butler | B29C 67/0088 700/119 |
| 2016/0167310 A1 | 6/2016 | Lee et al. | |
| 2016/0307070 A1* | 10/2016 | Jiang | G06K 9/6218 |
| 2017/0317983 A1* | 11/2017 | Kompalli | G06K 9/00442 |
| 2018/0088671 A1* | 3/2018 | Wang | G06F 3/017 |
| 2018/0089187 A1* | 3/2018 | Yoshii | G06K 9/4642 |
| 2018/0189325 A1* | 7/2018 | Hohwald | G06F 3/04817 |

OTHER PUBLICATIONS

Office Action dated Aug. 27, 2019 of the corresponding Japan patent application.

* cited by examiner

| First characteristic | First sub-object | Third sub-object | Seventh sub-object |
|---|---|---|---|
| Second characteristic | Second sub-object | | |
| Third characteristic | Fourth sub-object | Fifth sub-object | |
| Fourth characteristic | Sixth sub-object | | |

INTEGRATED 3D PRINTING SYSTEM

BACKGROUND OF THE INVENTION

1. Technical Field

The technical field relates to 3D printing technology, and specifically to an integrated 3D printing system.

2. Description of Related Art

According to the maturity of 3D printing technology, and the narrowed volume and reduced price of the 3D printers, the utilization of the 3D printers has become popular these days.

There are multiple types of 3D printers available in the market, each type of the 3D printers respectively adopts different printing technology and uses different material. For example, a 3D printer adopting selective laser sintering (SLS) technology is using laser beam to sinter the polymer powder to fuse the polymer powder together for constructing an object layer-by-layer. For another example, a 3D printer adopting stereolithography (SLA) technology is using point-light source or surface-light source to irradiate polymer resin for curing the resin through triggering the chemical reaction for constructing an object layer-by-layer.

The current 3D printing technologies in nowadays are usually importing a well-edited 3D object into a single 3D printer, and the 3D printer is responsible for building a physical 3D model corresponding to the imported 3D object through its embedded printing technology and material. In other words, the current 3D printers are only allowed to build the 3D models by using one single type of printing approach and one single type of material.

Accordingly, if a user needs to print a 3D object which is consisted of multiple portions with different strengths, characters and/or functions, it would not have been satisfied by the current 3D printing technologies discussed above.

SUMMARY OF THE INVENTION

The invention is directed to an integrated 3D printing system, which can perform a characteristic-classification action to multiple sub-objects included in one single 3D object, so as to separately print each of the sub-objects with different characteristics through multiple 3D printers of different printing types.

In one of the exemplary embodiments, the integrated 3D printing system at least includes a server, a first 3D printer, and a second 3D printer. The server includes a graphic user interface, a processor, and a connect port. The graphic user interface is used to import a 3D file and opens up and displays a 3D object in the 3D file, wherein the 3D object is consisted of multiple separable sub-objects. The graphic user interface further obtains respectively a designated characteristic of each of the multiple sub-objects and perform a characteristic-classification process to the multiple sub-objects to classify each of the multiple sub-objects. The processor is provided with multiple configuration tools corresponding to different characteristics, each of the configuration tools is respectively receiving one or more of the sub-objects having a corresponding characteristic from the graphic user interface and perform a slicing process to the received one or more sub-objects for generating a slicing data. The connect port is connected to the processor.

Wherein, the first 3D printer is connected to one of the configuration tools of the processor through the connect port and receiving the slicing data that is corresponding to a first characteristic from the connected configuration tool for performing a printing procedure. The second 3D printer is adopting a printing type different from the first 3D printer, connected to another one of the configuration tools of the processor through the connect port and receiving the slicing data that is corresponding to a second characteristic from the connected configuration tool for performing the printing procedure.

In comparison with related arts, the present invention can classify the multiple sub-objects included in one single 3D object into several categories and respectively prints each of the classified sub-objects having different characteristics through different 3D printers of different printing types, so as to ensure that each printed sub-object may respectively have a certain strength, character, and/or function requested by a user. The present invention may ensure that a completely-printed 3D object is simultaneously having different scales of strengths, characters and/or functions, which makes the current 3D printing technologies even more flexible.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
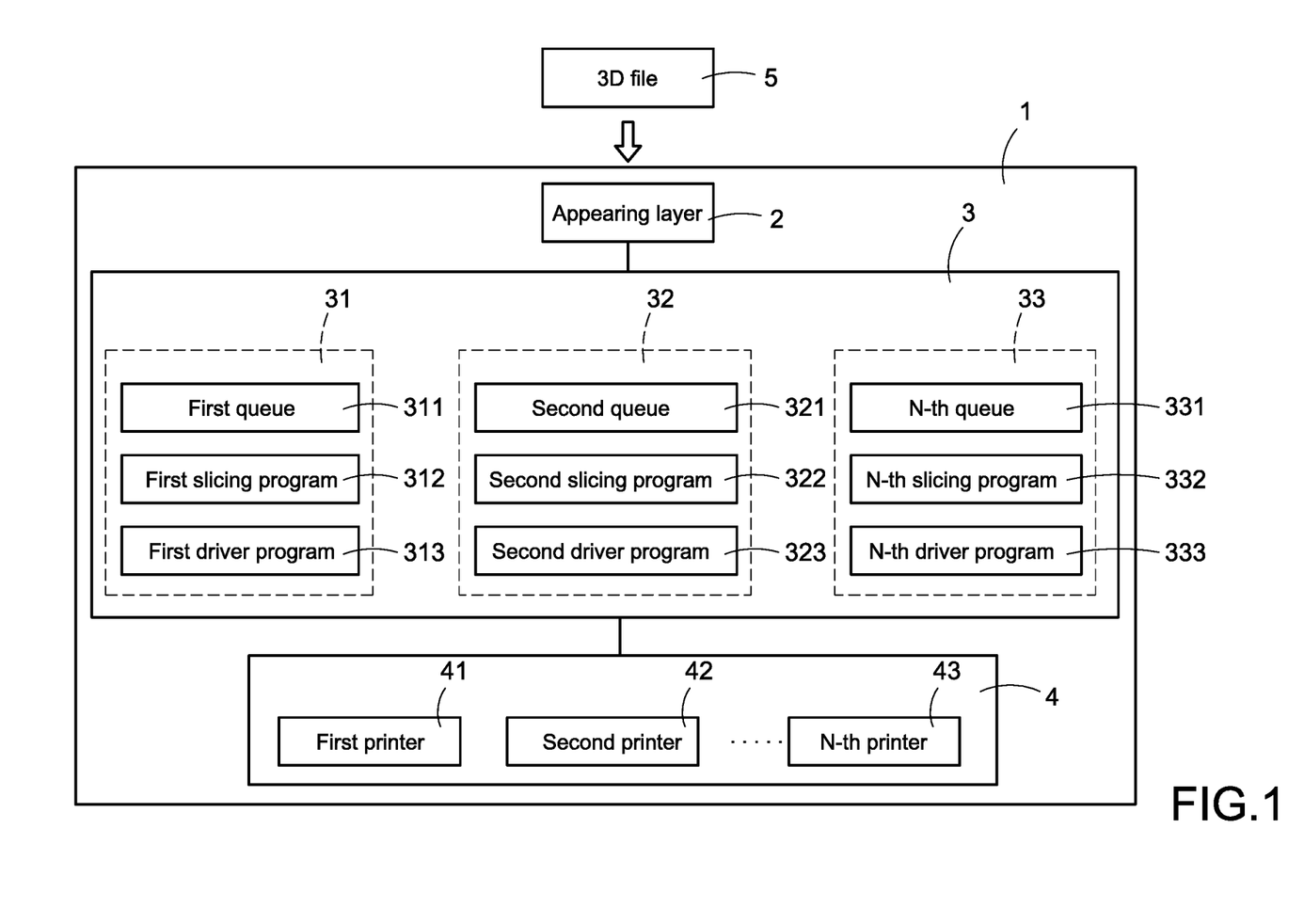
FIG. 1 is a schematic diagram depicting a 3D printing system according to a first embodiment of the present invention.

FIG. 1 is a schematic diagram depicting a 3D printing system according to a first embodiment of the present invention. The present invention discloses an integrated 3D printing system (referred to as a printing system 1 hereinafter), the printing system 1 is used for processing a well-edited 3D object (such as a 3D object 50 shown in FIG. 3), so as to classify multiple portions included in the 3D object into different categories, and implements multiple printing actions through multiple 3D printers of different printing types for respectively printing these portions which have been classified.

One of a major technical effect of the present invention is that, to respectively print different object portions with different characters through different types of 3D printer, and to integrate these printed object portions into a single physical 3D model needed by a user, may ensure that the single 3D model can simultaneously have multiple scales of strengths, characters and/or functions that are respectively requested.

As shown in FIG. 1, the printing system 1 may mainly include an appearing layer 2, a connecting layer 3 and a physical layer 4. The appearing layer 2 is mainly used to perform pre-processes to a 3D object which is about to be printed. The pre-processes may be, for example, displaying, editing, recognizing, separating, characteristic designating, classifying, etc., to the 3D object, but not limited thereto. The connecting layer 3 receives the 3D object from the appearing layer 2 after the 3D object has been pre-processed, and the connecting layer 3 may perform respectively a slicing process to each object portion separated from the 3D object for generating different sets slicing data and then transmits these sets of slicing data to corresponding 3D printers for being printed. The physical layer 4 may include multiple 3D printers of different printing types (such as a first printer 41, a second printer 42, to an n-th printer 43 shown in FIG. 1, wherein each of the printers 41-43 respectively has different printing type). Each of the 3D printers may respectively receive a corresponding set of slicing data from the connecting layer 3, and starts its own printing procedure thereupon.

In one embodiment, the printing system 1 may include a server and multiple 3D printers of different printing types, wherein the aforementioned appearing layer 2 and connecting layer 3 are implemented by the server, and the aforementioned physical layer 4 is implemented by the multiple 3D printers. In other words, the printing system 1 in this embodiment is to perform displaying, editing, recognizing, separating, characteristic designating, classifying, and slicing the 3D object through the server. The server transmits the processed data respectively to each corresponding 3D printer, and each of the 3D printers of different printing types is respectively printing according to the received data. In this embodiment, the server may be implemented as a cloud server or a personal computer, not limited thereto.

Here provided in the following is a more specific description.

The appearing layer 2 is used to import a 3D file 5 and opens up a 3D object recorded in the 3D file 5. In the embodiment, the 3D object is consisted of multiple separable sub-objects. The appearing layer 2 separates the 3D object into multiple sub-objects, and respectively obtains a designated characteristic of each of the sub-objects, therefore, the appearing layer 2 may perform a characteristic-classification process to the sub-objects according to the obtained designated characteristics for classifying these sub-objects into different categories according the these characteristics.

In one possible embodiment, a user may use a drawing software to draw multiple sub-objects respectively, and use these drawn sub-objects to construct the 3D object and store the constructed 3D object as the 3D file 5. In this embodiment, the appearing layer 2 may directly separate the 3D object into the multiple sub-objects the user had drawn after the 3D file 5 has been imported and the 3D object has been opened.

In particular, a human-machine interface may be provided by the appearing layer 2 and displayed on a screen of a computer (not shown). The human-machine interface may be used to receive external operations from the user for retrieving the multiple sub-objects from the 3D object accordingly.

In another possible embodiment, the appearing layer 2 may perform an image recognition action on the opened 3D object and divide the 3D object automatically into the multiple sub-objects according to a recognition result of the image recognition action. For example, if a 3D object is a cup, the appearing layer 2 may perform the image recognition action on the cup and divide the cup automatically into three sub-objects including a cup body, a cup grip, and a cup lid.

In another possible embodiment, the appearing layer 2 may first separate the 3D object into the multiple sub-objects, then receives external operations via the human-machine interface for the user to designate the characteristic for each sub-object. Therefore, the appearing layer 2 may use the designated characteristics to perform the aforementioned characteristic-classification process to each of the sub-objects for classifying each of the sub-objects into different categories.

In another possible embodiment, each of the sub-objects may be directly designated with a specific characteristic by the user when the user uses the drawing software to draw the 3D object.

In another possible embodiment, the appearing layer 2 may separate the 3D object into the multiple sub-objects, and perform the image recognition action to each of the sub-objects for identifying an object title of each sub-object (such as the aforementioned cup body, cup grip, and cup lid). Therefore, each of the sub-object may be automatically and respectively designated with a specific characteristic according to its object title.

In the present invention, the aforementioned characteristic may be the material used by the 3D printer, the printing type adopted by the 3D printer, etc., not limited thereto.

In particular, the material may be, for example, polylactic acid (PLA), polypropylene (PP), thermoplastic elastomer (TPE), metals, gypsum powder, photosensitive resin, etc., wherein, different materials are respectively adopted by different 3D printers of different printing types. In other words, if the multiple sub-objects are respectively designated with different characteristics (i.e., corresponding to different materials), these sub-objects will respectively be transmitted to different 3D printers in the physical layer 4 for being separately printed. As a result, these completely-printed object models may respectively have different strengths, characters and/or functions.

The aforementioned printing types can be understood as the 3D printing technologies adopted by the 3D printers in the physical layer 4, such as fused filament fabrication (FFF) type, stereolithography (SLA) type, selective laser sintering (SLS) type, three-dimension printing (3DP) type, etc., but not limited thereto. In other words, whenever a sub-object is designated with a specific characteristic (i.e., corresponding to a specific printing type), the sub-object may be transmitted to and printed by one of the multiple 3D printers in the physical layer 4 which adopts the corresponding printing type.

The connecting layer 3 of the printing system 1 is connected with the appearing layer 2. The connecting layer 3 is provided with multiple configuration tools, the multiple configuration tools are respectively corresponding to different characteristics. In the embodiment shown in FIG. 1, the multiple configuration tools are depicted as a first configuration tool 31, a second configuration tool 32, . . . , to an n-th configuration tool 33 for example (i.e., there'll be N configuration tools in maximum). The amount of the multiple configuration tools 31-33 may be set according to the real demand, such as being set according to the totally amount of the designated characteristics, or the totally amount of the printing types of the 3D printers, not only limited to what is shown in FIG. 1.

After the multiple sub-objects have been retrieved from the 3D object, the designated characteristic of each of the sub-objects has respectively been obtained and the characteristic-classification process has been performed to each of the sub-objects by the appearing layer 2, the connecting layer 3 may then receive, from the appearing layer 2, through each of the configuration tools 31-33 respectively, one or more sub-objects with a corresponding characteristic. For example, a first configuration tool 31 is corresponding to PP material, and the connecting layer 3 may receive one or more sub-objects which are designated with PP material (i.e., designated the PP material as its characteristic) from the appearing layer 2 through the first configuration tool 31; a second configuration tool 32 is corresponding to SLS printing type, and the connecting layer 3 may receive one or more sub-objects which are designated with SLS printing type (i.e., designated the SLS printing type as its characteristic) from the appearing layer 2 through the second configuration tool 32, and so on.

In the connecting layer 3, each of the configuration tools 31-33 may respectively perform a slicing process to the received one or more sub-objects for generating corresponding sets of slicing data. It is worth saying that each of the configuration tools 31-33 is respectively connected to a 3D printer which adopts a corresponding printing type, and is generating the set of slicing data that corresponds to the printing type adopted by the connected 3D printer.

For example, if the first configuration tool 31 is corresponding to the FFF type, then the first configuration tool 31 will be connected to a 3D printer in the physical layer 4 which adopts the FFF type as its printing type. After performing the slicing process to a sub-object, the first configuration tool 31 will be generating a set of slicing data in a GCODE file format that corresponds to the request of the FFF type 3D printer. For another example, if the second configuration tool 32 is corresponding to the SLA type, then the second configuration tool 32 will be connected to a 3D printer in the physical layer 4 which adopts the SLA type. After performing the slicing process to a sub-object, the second configuration tool 32 will be generating a set of slicing data in an image file format that corresponds to the request of the SLA type 3D printer.

The multiple printers in the physical layer 4 are 3D printers with different printing types, each of the 3D printers is respectively connected to different configuration tool 31-33 in the connecting layer 3 that associates with a corresponding characteristic. In the embodiment shown in FIG. 1, the multiple 3D printers are depicted as a first printer 41, a second printer 42, . . . , to an n-th printer 43 for example (i.e., there'll be N printers in maximum). However, the amount of the multiple 3D printers 41-43 may be set according to the real demand, such as being set according to the totally amount of the characteristics or the totally amount of the configuration tools 31-33, not limited to what is shown in FIG. 1.

When each of the configuration tools 31-33 respectively generates the aforementioned set of slicing data, each of the 3D printers 41-43 in the physical layer 4 may respectively receive the set of slicing data with the corresponding characteristic from the connecting layer 3, so as to perform the printing procedure respectively. Therefore, each of the 3D printers 41-43 may respectively print, by using the corresponding material, an object model having a requested strength, character and/or function.

Figure 2:
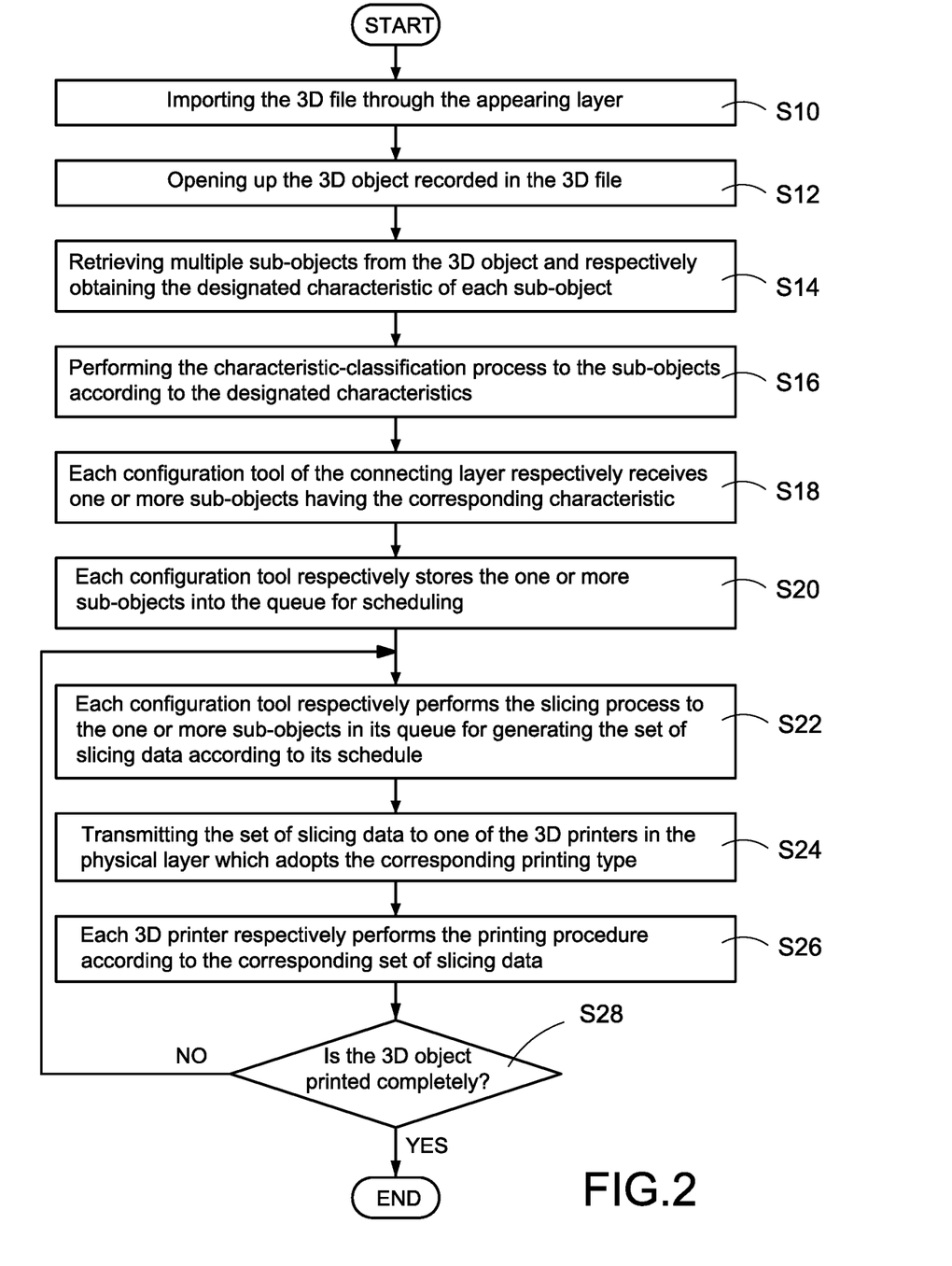
FIG. 2 is a flowchart depicting a printing method according to a first embodiment of the present invention.

FIG. 2 is a flowchart depicting a printing method according to a first embodiment of the present invention. The present invention further discloses an integrated 3D printing method (referred to as a printing method hereinafter), and the printing method is mainly adopted by the printing system 1 shown in FIG. 1.

As shown in FIG. 2, when printing under the printing method, the printing system 1 first imports the 3D file 5 through the appearing layer 2 (step S10), and the appearing layer 2 opens up the 3D object recorded in the 3D file 5 (step S12). As discussed above, the 3D object here is basically consisted of multiple separable sub-objects.

Next, the appearing layer 2 may retrieve each of the sub-objects from the 3D object, and respectively obtains a designated characteristic of each of the sub-objects (step S14). In particular, the multiple sub-objects may be separately drawn by the user in a drawing phase, and the step S14 in one embodiment may receive external operations from the user through a human-machine interface of the appearing layer 2 for manually dividing the 3D object into the multiple sub-objects. Otherwise, the appearing layer 2 in the step S14 may analyze the 3D object through an algorithm (not shown) for automatically dividing the 3D object into the multiple sub-objects.

Besides, the aforementioned characteristics may: (1) be well-designated by the user at the drawing phase; (2) be manually designated by receiving the external operations from the user through the human-machine interface of the appearing layer 2 during the step S14; or (3) be automatically designated by the appearing layer 2 during the step S14 through analyzing each sub-object by an algorithm (for example, identifying an object title of each sub-object, and automatically designating the characteristic for each sub-object according to the identified object title).

In one embodiment, the so-called characteristics are the materials respectively adopted by the 3D printers, or the printing types of the 3D printers, not limited thereto.

After the step S14, the appearing layer 2 may perform a characteristic-classification process to the sub-objects according to the designated characteristic of each sub-object (step S16), and then transmits each classified sub-object to the connecting layer 3. In particular, the appearing layer 2 in the step S16 is to respectively transmit each of the sub-objects to one of the configuration tools 31-33 in the connecting layer 3 which associates with the corresponding characteristic according to a classification result of the characteristic-classification process.

The connecting layer 3 uses each of the multiple configuration tools 31-33 to respectively receive one or more sub-objects having the corresponding characteristic (step S18). For example, after the appearing layer 2 finishes the characteristic-classification process, a configuration tool associated with a first characteristic may receive, from the appearing layer 2, one or more sub-objects being classified as a first category (i.e., being designated with the first characteristic), another configuration tool associated with a second characteristic may receive, from the appearing layer 2, one or more sub-objects being classified as a second category (i.e., being designated with the second characteristic), and so on. Next, each of the configuration tools 31-33 may respectively perform the slicing process to the one or more received sub-objects for generating the set of slicing data correspondingly.

In particular, each of the configuration tools 31-33 respectively has a queue. As shown in FIG. 1, the first configuration tool 31 is provided with a first queue 311, the second configuration tool 32 is provided with a second queue 321, the n-th configuration tool 33 is provided with an n-th queue 331. Because more than one sub-objects may be classified as same category, each of the configuration tools 31-33 in this embodiment is respectively storing the one or more received sub-objects into the queue temporarily, so as to schedule the one or more sub-objects just received (step S20). Also, each of the configuration tools 31-33 may respectively perform the slicing process to the one or more sub-objects in its queue according to its schedule (step S22).

More specific, each of the configuration tools 31-33 may first perform the slicing process to the sub-object on top of its queue for generating a corresponding set of slicing data, and then transmits the set of slicing data to one of the 3D printers in the physical layer 4 which adopts the corresponding printing type (step S24), therefore, each of the 3D printers in the physical layer 4 may respectively receive the corresponding set of slicing data with the corresponding characteristic for performing the printing procedure (step S26).

After the step S26, the printing system 1 may determine whether the 3D object is completely printed (step S28). In particular, the printing system 1 is to determine whether the sub-objects in the queues of the configuration tools 31-33 are all processed completely or not. If any non-processed sub-object is left in any queue, the printing system 1 controls the connecting layer 3 and the physical layer 4 to again execute the steps S22 to S26, so as to obtain the next sub-object from the queue according to its schedule, to perform the slicing process to the obtained sub-object for generating the corresponding set of slicing data, and to transmit the set of slicing data to the corresponding 3D printer for printing.

If the printing system 1 determines that sub-objects in the queues are all processed completely in the step S28, it indicates that all the sub-objects separated from the 3D object are all printed completely, and the printing system 1 can then terminate the printing method.

Figure 3:
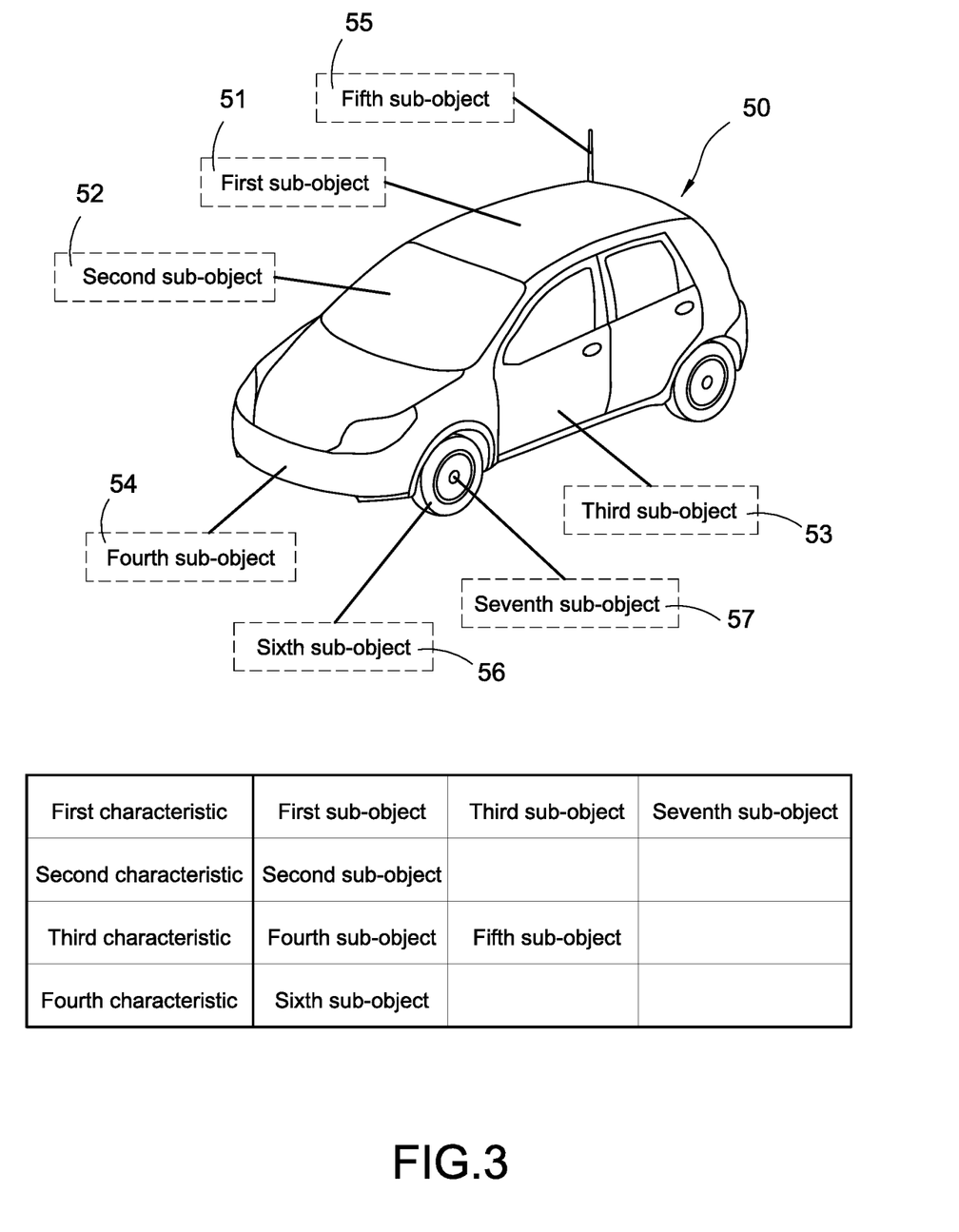
FIG. 3 is a schematic diagram depicting an appearing layer according to a first embodiment of the present invention.
Figure 4:
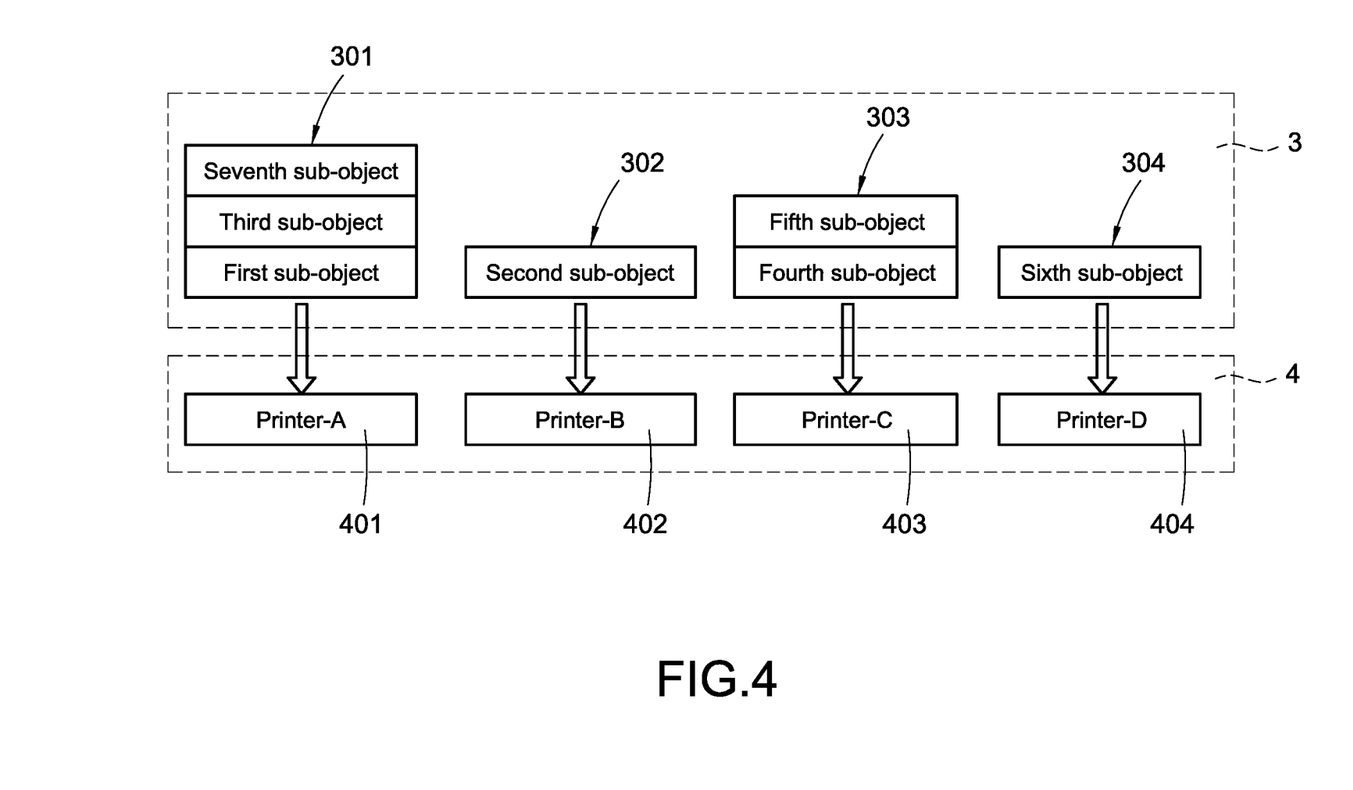
FIG. 4 is a schematic diagram depicting a printing queue according to a first embodiment of the present invention.

Refers to FIG. 3 and FIG. 4, wherein FIG. 3 is a schematic diagram depicting an appearing layer according to a first embodiment of the present invention, FIG. 4 is a schematic diagram depicting a printing queue according to a first embodiment of the present invention.

In the embodiment shown in FIG. 3, the printing system 1 may import a 3D file 5 and open up a 3D object 50 (an automobile is taken as an example in FIG. 3) from the 3D file 5 through the appearing layer 2. As shown, the 3D object 50 is consisted of multiple separable sub-objects, including a first sub-object 51 (a roof), a second sub-object 52 (a window), a third sub-object 53 (a door), a fourth sub-object 54 (a bumper), a fifth sub-object 55 (an antenna), a sixth sub-object 56 (a wheel), and a seventh sub-object 57 (a wheel frame). However, the above description is just an exemplary embodiment, the real amount and item of the multiple sub-objects 51-57 are depending on the content of the imported 3D file 5, not limited to what is shown in FIG. 3.

As described above, a user may directly designate the characteristic for each sub-object 51-57 while drawing the 3D object 50 by using an electronic equipment. In another scenario, the user may first open up the 3D object 50 through the appearing layer 2 of the printing system 1, and then respectively designate the characteristic for each sub-object 51-57 through operating the human-machine interface provided by the appearing layer 2.

In one embodiment, the human-machine interface may display multiple characteristics that are supported by the physical layer 4 through a menu or a scrolling list (not shown), therefore, the user may designate a specific characteristic for a sub-object by selecting one of the displayed characteristics and associating the selected characteristic to the sub-objects. In another embodiment, the human-machine interface may display a table as shown in FIG. 3 for indicating the multiple characteristics that is supportable to the physical layer 4, therefore, the user may designate the characteristic for each sub-object 51-57 by respectively inputting, selecting or dragging each of the sub-objects 51-57 into a corresponding column representing to the designated characteristic.

In the table shown in FIG. 3, the first sub-object 51, the third sub-object 53 and the seventh sub-object 57 are designated with a first characteristic (such as FFF type) by being dragged into the columns representing to the first characteristic, the second sub-object 52 is designated with a second characteristic (such as SLA type) by being dragged into the column representing to the second characteristic, the fourth sub-object 54 and the fifth sub-object 55 are designated with a third characteristic (such as SLS type) by being dragged into the columns representing to the third characteristic, the sixth sub-object 56 is designated with a fourth characteristic (such as 3DP type) by being dragged into the column representing to the fourth characteristic.

As mentioned above, one of the technical feature of the present invention is that, the user may confirm an identity (or a title) of a sub-object through the drawing software or the appearing layer 2 of the printing system 1 (for example, confirming that the third sub-object 53 is a door, the fourth sub-object 54 is a bumper, etc.), and designate a specific characteristic for this sub-object according to its identity, use, requested strength or suitable character of this sub-object (for example, a 3D printer with SLA printing type is suitable for constructing a door of a car, a 3D printer with SLS printing type is suitable for constructing a bumper, etc.). Therefore, a completely printed 3D model (which is constructed by multiple object models respectively printed by the multiple 3D printers) will be more diversity.

As shown in FIG. 4, each of the configuration tools in the connecting layer 3 is respectively provided with a queue (a queue-A 301, a queue-B 302, a queue-C 303, and a queue-D 304 are taken as an example in FIG. 4). After obtaining the characteristic of each of the sub-objects and completing the characteristic-classification process, the appearing layer 2 may respectively transmit each of the sub-objects to the corresponding one of the configuration tools of the connecting layer 3 according to a classification result of the characteristic-classification process. Each of the configuration tools may then respectively store the one or more received sub-objects into its queue, so as to schedule each of the received sub-objects.

In the embodiment of FIG. 4, the queue-A 301 corresponds to the first characteristic shown in FIG. 3, so the configuration tool (such as a configuration tool-A) will temporarily store the first sub-object 51, the third sub-object 53 and the seventh sub-object 57 into the queue-A 301 in the exact order for scheduling. The queue-B 302 corresponds to the second characteristic shown in FIG. 3, so the configuration tool (such as a configuration tool-B) will temporarily store the second sub-object 52 into the queue-B 302 for scheduling. The queue-C 303 corresponds to the third characteristic shown in FIG. 3, so the configuration tool (such as a configuration tool-C) will temporarily store the fourth sub-object 54 and the fifth sub-object 55 into the queue-C 303 for scheduling. The queue-D 304 corresponds to the fourth characteristic shown in FIG. 3, so the configuration tool (such as a configuration tool-D) will temporarily store the sixth sub-object 56 into the queue-D 304 for scheduling. The technical solution of the present invention is to schedule the multiple sub-objects of different characteristics through multiple queues, so as to manage the printing procedures of the multiple 3D printers with different printing types, and makes the overall work of these 3D printers even more fluent.

In FIG. 1, each of the configuration tools 31-33 in the connecting layer 3 may respectively have a slicing program for performing the aforementioned slicing process. In FIG. 1, a first slicing program 312, a second slicing program 322, . . . , to an n-th slicing program 332 are taken as an example. Each of the slicing programs is respectively obtaining the one or more sub-objects from the corresponding queue, and performs the slicing process to the one or more sub-objects for generating the corresponding set of slicing data.

It should be noted that each of the slicing programs is respectively corresponding to the printing type of the 3D printer which is connected thereto and performing the slicing process which corresponds to such printing type, it turns out generating the set of slicing data which is supportable to such 3D printer.

Each of the configuration tools respectively generates the set of slicing data through its slicing program, and then transmits the set of slicing data to the corresponding 3D printer in the physical layer 4 through its schedule, therefore, each of the 3D printers may respectively act for printing a corresponding object model based on the received set of slicing data. In the embodiment of FIG. 4, the physical layer 4 at least includes a printer-A 401 associated with the queue-A 301, a printer-B 402 associated with the queue-B 302, a printer-C 403 associated with the queue-C 303, and a printer-D 404 associated with the queue-D 304, that is to say, the printer-A 401 is used to print the first sub-object 51, the third sub-object 53, and the seventh sub-object 57 temporarily stored and scheduled in the queue-A 301, the printer-B 402 is used to print the second sub-object 52 temporarily stored in the queue-B 302, the printer-C 403 is used to print the fourth sub-object 54 and the fifth sub-object 55 temporarily stored and scheduled in the queue-C 303, and the printer-D 404 is used to print the sixth sub-object 56 temporarily stored in the queue-D 304.

However, the above description is just one of the exemplary embodiments of the present invention, the user may increase or decrease the amount and the types of the 3D printers according to the object models needed to be printed, not limited to what is shown in FIG. 4.

As shown in FIG. 1, each of the configuration tools 31-33 may respectively have a driver program for driving the 3D printer connected thereto. In the embodiment of FIG. 1, a first driver program 313, a second driver program 323, . . . , to an n-th driver program 333 are taken as an example. Each of the configuration tools may respectively trigger the connected 3D printer through its driver program when transmitting the set of slicing data to such 3D printer, therefore, each of the 3D printers may be respectively triggered for performing its printing procedure according to the received set of slicing data.

In one embodiment, the aforementioned slicing program and driver program may be integrated into a unity, which is a single program executed for performing the slicing process and also triggering the corresponding 3D printer.

In the embodiment of FIG. 1 and FIG. 4, each of the configuration tools is respectively associated with one characteristic and is only connected to one 3D printer with the corresponding printing type. In another embodiment, however, each configuration tool may be simultaneously connected to more than one 3D printers corresponding to the same printing type.

Figure 5:
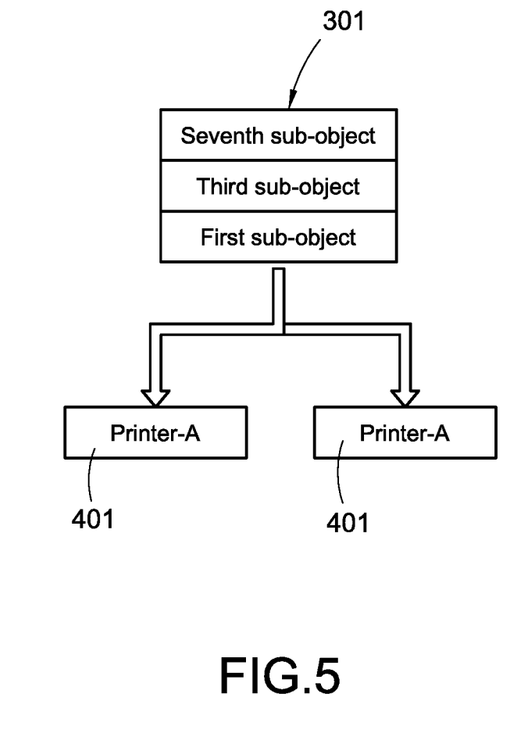
FIG. 5 is a schematic diagram depicting a printing queue according to a second embodiment of the present invention.

FIG. 5 is a schematic diagram depicting a printing queue according to a second embodiment of the present invention. As shown in FIG. 5, one configuration tool (such as a configuration tool-A) may include the aforementioned queue-A 301 and simultaneously connect to multiple printers-A 401 with same printing type. In this embodiment, the configuration tool-A may have embedded multiple driver programs (not shown), which are respectively corresponding to the multiple printers-A 401 connected thereto and respectively used for triggering the multiple printers-A 401.

In the embodiment of FIG. 5, if three printers-A 401 are connected at the same time, the configuration tool-A may perform the slicing process to the first sub-object 51, the third sub-object 53 and the seventh sub-object 57 at the same time through the slicing program, and transmits these different sets of slicing data respectively to these three printers-A 401 (through three driver programs). As a result, the printing system 1 may synchronously print the first sub-object 51, the third sub-object 53 and the seventh sub-object 57 having the same characteristic through three prints-A 401 adopting the same printing type, so as to speed up the overall printing procedure.

By using the printing system and the printing method of the present invention, a user may divide an entire 3D object into multiple portions of sub-object, classifies these portions of sub-object into different categories, and then prints each of the portions respectively. Therefore, a completely-printed 3D model according to the 3D object may simultaneously have different strengths, characters and/or functions, so the utility of 3D printing technologies is further improved.

Figure 6:
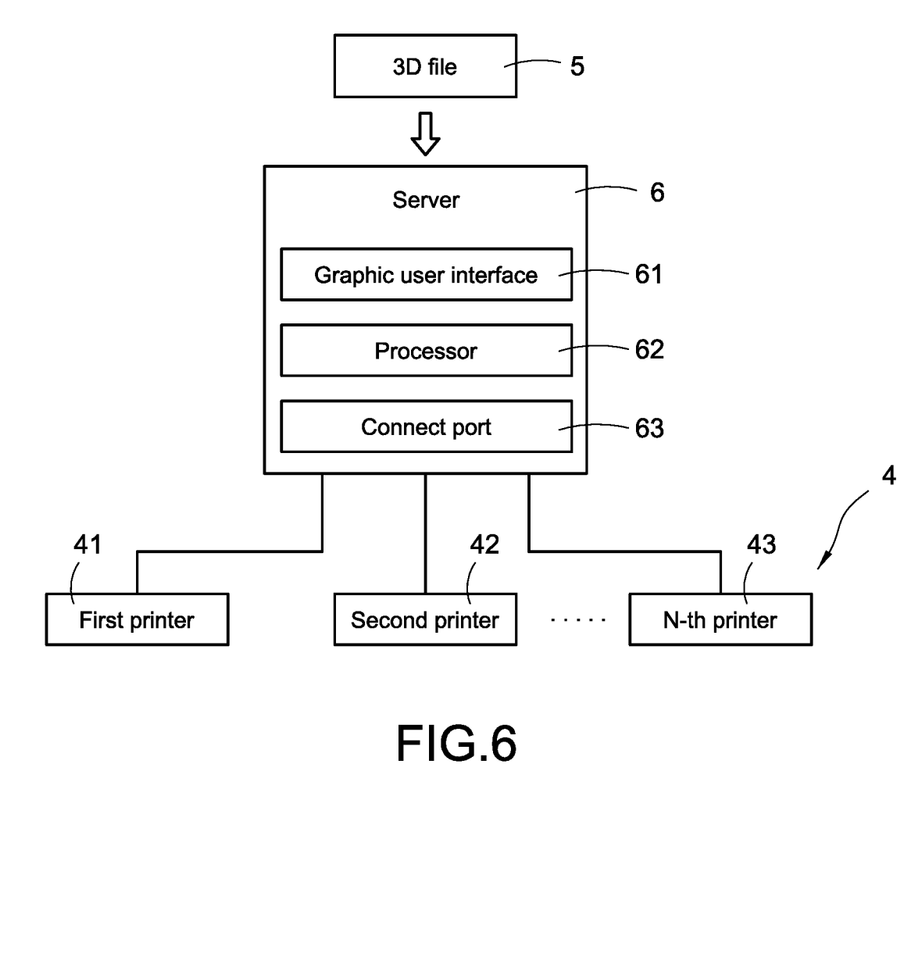
FIG. 6 is a schematic diagram depicting a 3D printing system according to a second embodiment of the present invention.

FIG. 6 is a schematic diagram depicting a 3D printing system according to a second embodiment of the present invention. In the second embodiment, a printing system 1 mainly includes a server 6 (a local server or a cloud server) and multiple 3D printers 41-43 of different printing types. As shown in FIG. 6, the server 6 may have a graphic user interface (GUI) 61, a processor 62, and a connect port 63, which are used to implement the appearing layer 2 and connecting layer 3 in the first embodiment. The multiple 3D printers 41-43 in this embodiment are used to implement the physical layer 4 in the first embodiment.

Here provided in the following is a more specific description for the second embodiment of the present invention.

In this embodiment, the server 6 may import a well-edited 3D file 5 through the graphic user interface 61 and opens up a 3D object recorded in the 3D file 5. As described above, the 3D object here is an object consisted of multiple separable sub-objects. The graphic user interface 61 may separate the 3D object into the multiple sub-objects automatically or manually through user's operations, and the graphic user interface 61 also obtains the designated characteristic of each of the sub-objects. Therefore, the graphic user interface 61 may perform the aforementioned characteristic-classification process to these sub-objects according to these obtained characteristics for classifying these sub-objects into different categories.

In this embodiment, the processor 62 is connected with the graphic user interface 61. In another embodiment, the graphic user interface 61 may be established and provided directly by the processor 62.

In this embodiment, the processor 62 establishes the aforementioned configuration tools of the connecting layer 3 by software or hardware. Each of the configuration tools is respectively corresponding to different characteristic (for example, a first configuration tool is associated with a first characteristic, a second configuration tool is associated with a second characteristic, etc.). After the graphic user interface 61 (corresponding to the appearing layer 2 in the first embodiment) finishes the characteristic-classification process, the processor 62 (corresponding to one part of the connecting layer 3 in the first embodiment) may use each of the configuration tools to respectively receive from the graphic user interface 61 the classified one or more sub-objects having the corresponding characteristic. Therefore, the processor 62 may use each of the configuration tools to respectively perform the slicing process to the received sub-objects and generates corresponding set of slicing data.

In this embodiment, the connect port 63 is connected to the processor 62, which is used to implement the connecting layer 3 in the first embodiment in company with the processor 62. In particular, the server 6 may connect the multiple 3D printers 41-43 through the connect port 63 (corresponding to second part of the connecting layer 3 in the first embodiment), and the server 6 assigns each of the configuration tools inside the processor 62 respectively to one of the 3D printers adopting the corresponding printing type. It should be noted that each of the configuration tools inside the processor 62 may respectively perform the slicing process associated with its corresponding characteristic and generates the set of slicing data needed by and supportable to the 3D printer connected thereto.

The multiple 3D printers 41-43 may respectively connect to one of the configuration tools associated with the corresponding characteristic inside the processor 62 through the connect port 63 (such as USB, IEEE, etc.). After each of the configuration tools generates the set of slicing data respectively, each of the 3D printers 41-43 may respectively receive the corresponding set of slicing data through the connect port 63, so as to perform its printing procedure. In the end, each of the 3D printers 41-43 may respectively act for printing an object model having the requested strength, character and/or function by using its specific material that is corresponding to the characteristic.

As the skilled person will appreciate, various changes and modifications can be made to the described embodiment. It is intended to include all such variations, modifications and equivalents which fall within the scope of the present invention, as defined in the accompanying claims.

What is claimed is:

1. An integrated 3D printing system, comprising:
   a server, comprising:
   a graphic user interface, importing a 3D file for opening up and displaying a 3D object in the 3D file, wherein the 3D object is consisted of multiple separable sub-objects, and the graphic user interface is configured to perform an image recognition action to each of the multiple sub-objects for identifying an object title of each of the multiple sub-objects and to automatically designate a characteristic for each of the multiple sub-objects according to the identified object titles, and the graphic user interface is configured to perform a characteristic-classification process to the multiple sub-objects according to the automatically designated characteristics for classifying the multiple sub-objects into different categories;
   a processor, connected to the graphic user interface, provided with multiple configuration tools respectively associated with different characteristics, wherein each of the multiple configuration tools is configured to receive one or more of the sub-objects having a corresponding characteristic from the graphic user interface and perform a slicing process to the received one or more sub-objects for generating a set of slicing data; and
   a connect port, connected to the processor;
   a first 3D printer, connected to one of the configuration tools of the processor through the connect port, configured to receive one set of slicing data that is corresponding to a first characteristic from the connected configuration tool for performing a printing procedure; and
   a second 3D printer, adopting a printing type different from the first 3D printer, connected to another one of the configuration tools of the processor through the connect port, configured to receive another set of slicing data that is corresponding to a second characteristic from the connected configuration tool for performing the printing procedure.

2. The integrated 3D printing system in claim 1, wherein the characteristic is a material to use or a printing type to adopt.

3. The integrated 3D printing system in claim 2, wherein the graphic user interface is configured to receive a first external operation to divide the 3D object into the multiple sub-objects.

4. The integrated 3D printing system in claim 2, wherein the printing type of the first 3D printer and the second 3D printer is fused filament fabrication (FFF) type, stereolithography (SLA) type, selective laser sintering (SLS) type or three-dimension printing (3DP) type.

5. The integrated 3D printing system in claim 2, wherein each of the multiple configuration tools comprises a queue, each of the multiple configuration tools is configured to temporarily store the one or more sub-objects having the corresponding characteristic into the queue for scheduling the sub-objects and perform the slicing process to the sub-objects according to scheduling.

6. The integrated 3D printing system in claim 5, wherein each of the multiple configuration tools comprises a slicing program for performing the slicing process, and each of the slicing programs is corresponding to the printing type of a connected 3D printer.

7. The integrated 3D printing system in claim 6, wherein each of the multiple configuration tools comprises a driver program for triggering the connected 3D printer.

8. The integrated 3D printing system in claim 6, wherein each of the multiple configuration tools comprises plurality of the driver programs, each of the multiple driver programs is configured to trigger one of a plurality of connected 3D printers, wherein the plurality of 3D printers connected to same configuration tool are adopting same printing type.

* * * * *